United States Patent [19]

Cole

[11] Patent Number: 5,776,569
[45] Date of Patent: Jul. 7, 1998

[54] COATING COMPOSITION FOR METAL CONTAINERS

[75] Inventor: Harold F. Cole, Racine, Wis.

[73] Assignee: The Dexter Corporation, Windsor Locks, Conn.

[21] Appl. No.: 640,686

[22] Filed: May 1, 1996

Related U.S. Application Data

[63] Continuation-in-part of Ser. No. 395,382, Feb. 21, 1995, Pat. No. 5,514,433, which is a continuation of Ser. No. 100,563, Jul. 30, 1993, abandoned.

[51] Int. Cl.$^6$ .............................. B29D 22/00; B32B 1/08; C08F 8/00; C08L 63/00
[52] U.S. Cl. .................... 428/35.8; 428/413; 428/418; 428/500; 427/376.1; 427/385.5; 427/386; 525/109; 525/529; 106/14.41
[58] Field of Search ................ 427/376.1, 385.5, 427/386; 428/35.8, 413, 418, 500; 525/109, 529; 106/14.41

[56] References Cited

U.S. PATENT DOCUMENTS

| | | | |
|---|---|---|---|
| 3,114,725 | 12/1963 | Kaufman, Jr. et al. | 260/32.8 |
| 3,305,602 | 2/1967 | Bromstead | 260/853 |
| 3,637,103 | 1/1972 | Ptak | 215/40 |
| 3,716,400 | 2/1973 | Tryzna et al. | 428/35.8 |
| 4,355,122 | 10/1982 | Fan | 523/423 |
| 4,524,107 | 6/1985 | Marchetti et al. | 428/413 |
| 5,039,768 | 8/1991 | Gerace et al. | 526/279 |
| 5,223,025 | 6/1993 | Seibel | 106/14.37 |

FOREIGN PATENT DOCUMENTS

| 2092023 | 8/1982 | United Kingdom | B32B 15/08 |
|---|---|---|---|

OTHER PUBLICATIONS

Saunders, "Organic Polymer Chemistry," 2d Ed., Chapman and Hall, (1988), p. 431.

Karas et al., "Preloading Compositions . . . Metal," CA 97(22):184111/u (Aug. 26, 1982).

*Primary Examiner*—Randy Gulakowski
*Attorney, Agent, or Firm*—Marshall, O'Toole, Gerstein, Murray & Borun

[57] ABSTRACT

A coating composition for metal containers, a method of coating a metal container, and a metal article useful as a food or beverage container are disclosed. The coating composition for metal container interiors and exteriors comprises: (a) a low molecular weight polyfunctional epoxy novolac resin; (b) a phenolic resin; (c) a solution grade vinyl chloride copolymer, a high molecular weight epoxy resin or a mixture thereof; (d) about 60% to about 90% by weight of nonvolatile material of a vinyl chloride dispersion resin; and a nonaqueous carrier. The coating composition is stored as a single unit system from manufacture until use without an unacceptable increase in viscosity.

17 Claims, No Drawings

COATING COMPOSITION FOR METAL CONTAINERS

CROSS-REFERENCE TO RELATED APPLICATION

This application is a continuation-in-part of application Ser. No. 08/395,382, filed Feb. 21, 1995, now U.S. Pat. No. 5,514,433, issued May 17, 1996, which is a continuation of application Ser. No. 08/100,563, filed on Jul. 30, 1993, now abandoned.

FIELD OF THE INVENTION

The present invention relates to a method of coating a metal container; to a coating composition for a metal container exterior and interior that, after curing, demonstrates excellent adhesion, mar resistance, product resistance, and flexibility; and to a metal article, like a metal container or can, having at least one surface coated with an adherent layer of the cured coating composition. The coating composition comprises: (a) a low molecular weight polyfunctional epoxy resin; (b) a phenolic resin; (c) a solution grade vinyl chloride copolymer, a high molecular weight epoxy resin, or a mixture thereof; (d) about 60% to about 90% by weight of nonvolatile material of a vinyl chloride dispersion resin; and (e) a nonaqueous carrier. The coating composition is stable and can be stored as a single unit system from manufacture until use without gelling or generating a commercially unacceptable increase in viscosity.

BACKGROUND OF THE INVENTION

Metal containers for foods and beverages are generally made from aluminum, tin-free steel, black-plate and tinplate steel (which is cold rolled steel sheet coated with a thin layer of tin). Because such metal containers are subject to air oxidation or rusting, and to corrosion caused during the pasteurization and sterilization of the beer, soda pop, and various food products which are packaged in such containers, coating compositions are used to protect the metal from chemical attack, which could lead to perforation of the can, loss of vacuum and spoilage of the food product, and to protect the food products from the deleterious byproducts of chemical attack. Due to their potential contact with food products, such coatings present additional problems of toxicology and taste considerations.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible and more adhesive coating, but often, improving one particular advantageous property is achieved at the expense of another advantageous property. For example, if the adhesive properties of a coating are improved, the flexibility of the coating can be adversely affected.

In addition, practical considerations limit the thickness, adhesive properties, and flexibility of a coating applied to a metal substrate. For example, thick coatings are expensive, require a longer cure time, can be esthetically unpleasing and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. In addition, investigators are confronted with the problem of providing a coating that meets FDA regulations and that is stable and easy to apply. A useful coating for the interior of a metal container must be able to withstand the solvating properties of a product packaged in the metal container. The coating also must be able to withstand acidic products such as mayonnaise, meats, fish, and pickles. Tuna packed in water or in oil are products that require a coating composition to impart both chemical resistance and corrosion inhibition. If the coating does not possess sufficient chemical resistance, components of the coating can be extracted into the packaged product and adversely affect the product. Even small amounts of extracted coating components can adversely affect sensitive products by imparting an off-taste to the product.

In addition, the coating must be able to withstand processing steps used in preparing the finished packaged product. For example, when foods such as soup are packaged in a container, the filled container is subjected to a sterilizing treatment during which the container is subjected to retort water (i.e., pressure cooker-type) or steam over a prescribed period (e.g., about 10 minutes to many hours). The coating composition must be able to withstand this treatment, and also must be capable of withstanding the forming and bending operations used in fabricating a metal can. Still further, the coating composition should be economical, and capable of being readily applied to metal surfaces.

Epoxy-based coatings and polyvinyl chloride-based coatings have been used to coat metal containers and closures for foods and beverages because these coatings exhibit an acceptable combination of adhesion to a metal substrate, flexibility, chemical resistance, and corrosion inhibition. However, epoxy-based coatings have the serious disadvantage of being considerably more expensive than polyvinyl chloride-based compositions.

Coatings based on polyvinyl chloride or related halide-containing vinyl polymers, like polyvinylidene chloride, possess the above-listed advantageous properties of chemical resistance and corrosion inhibition, and also are economical. Nevertheless, investigators continually seek improved coating compositions for food and beverage containers and closures, and for metal containers in general, that retain the advantageous properties of adhesion, flexibility, chemical resistance, and corrosion inhibition, and that are economical and do not adversely affect the taste or other esthetic properties of sensitive food and beverages packaged in the container. The present invention is directed to an improved polyvinyl chloride-based coating composition useful for coating the interior or exterior of metal articles, like can ends, can bodies, or closures wherein the metal article can be a container for a food or beverage, or for a nonfood product, such as a cleaner.

The present coating compositions obviate a primer coating for the metal substrate, and have an extensive range of uses. However, the present coating compositions can be used with a primer coating. The coating compositions of the present invention have excellent adherence properties with respect to unprimed and primed metal surfaces, and at the same time have outstanding chemical resistance properties. The present compositions also can be stored in a single unit package from manufacture until use without either generating an unacceptable increase in viscosity, or gelling.

Prior investigators have studied coating compositions including a combination of an epoxy resin, a solution grade vinyl chloride copolymer, and a vinyl chloride dispersion resin. Kaufman, Jr. et al. U.S. Pat. No. 3,114,725 discloses a coating composition including the three above-listed ingredients. The compositions disclosed by Kaufman, Jr. et al. include 10 to 50 percent by weight of the vinyl chloride dispersion resin. The coating compositions disclosed by Kaufman, Jr. et al. typically were packaged and stored as a two-unit system because admixture of all composition ingredients could lead to an unacceptable increase in viscosity within 24 to 48 hours. A careful selection of composition ingredients may provide a stable one-unit system. Bromstead U.S. Pat. No. 3,305,602 discloses a coating composition including a vinyl chloride dispersion resin, a solution grade vinyl chloride copolymer, and an acrylic resin.

Although the above-identified patents disclose compositions for coating a food or beverage container, the references do not teach or suggest a coating composition: (1) having 60% to 90% by weight of nonvolatile material of a vinyl chloride dispersion resin and (2) 2% to 25% by weight of a high molecular weight epoxy resin that (3) can be stored as a single unit system for an extended time period (4) without gelling or exhibiting an unacceptable increase in viscosity. The coating composition, after curing, demonstrates: (1) excellent flexibility; (2) excellent adhesion; (3) excellent mar and scratch resistance; (4) excellent chemical resistance and corrosion inhibition; and (5) improved economics compared to standard polyvinyl chloride coatings. Previously, persons skilled in the art avoided the combination of a vinyl chloride dispersion resin and a high molecular weight epoxy resin because of the conflicting solubility characteristics exhibited by these two different resins.

As an added advantage, the present coating compositions also can be used both on the interior can ends and on can bodies, obviating the use of two different coating compositions by container manufacturers. Furthermore, the present coating compositions exhibit sufficient clarity, hardness and mar resistance after curing for use as a coating on the exterior of a metal container. Accordingly, because of improved chemical and physical properties and improved economics, a coating composition of the present invention has a more universal range of applications, such as for the interior coating of a metal container or closure for food or beverage products or for the exterior coating of a metal container, and overcomes the economic disadvantages presented by prior epoxy-based and polyvinyl chloride-based coatings.

SUMMARY OF THE INVENTION

The present invention is directed to a coating composition that, after curing, effectively inhibits corrosion of a metal substrate; does not adversely affect products packaged in a container having an interior surface coated with the composition; and exhibits excellent flexibility, hardness, chemical resistance and adhesion. The coating composition also can be used both on can ends and bodies, and on closures, and on container interiors and exteriors. The coating composition effectively inhibits corrosion of ferrous and nonferrous metal substrates when the composition is applied to a surface of the metal substrate, then cured for a sufficient time and at a sufficient temperature to provide a crosslinked coating. The crosslinked coating demonstrates sufficient chemical and physical properties for use on the interior of containers used to package foods and beverages.

The present coating composition overcomes the disadvantages associated with prior polyvinyl chloride-based compositions and prior epoxy resin-based compositions, and comprises: (a) a low molecular weight poly-functional epoxy resin; (b) a phenolic resin; (c) a solution grade vinyl chloride copolymer, a high molecular weight epoxy resin, or a mixture thereof; (d) about 60% to about 90% by weight of nonvolatile material of a vinyl chloride dispersion resin; and (e) a nonaqueous carrier. In particular, the present coating composition comprises: (a) about 2% to about 25%, by weight of nonvolatile material, of a low molecular weight polyfunctional epoxy resin, such as an epoxy resin having a weight average molecular weight of about 200 to about 10,000, and preferably about 200 to about 8,000; (b) about 2% to about 25%, by weight of nonvolatile material, of a phenolic resin; (c) about 2% to about 25%, by weight of nonvolatile material, of a solution grade vinyl chloride copolymer, a high molecular weight epoxy resin, or a mixture thereof, wherein the high molecular weight epoxy resin has a weight average molecular weight of about 10,000 to about 70,000; (d) about 60% to about 90%, by weight of nonvolatile material, of a vinyl chloride dispersion resin, in a nonaqueous carrier.

Components (a), (b), (c), and (d) are dispersed in a nonaqueous carrier such that the coating composition includes about 20% to about 70% by weight of the total composition, of nonvolatile components (a), (b), (c), and (d). Other optional components, such as 0% to about 10% by weight of nonvolatile material of a lubricant, like a wax, or an additive to enhance composition esthetics or performance, also can be included in the composition, and accordingly increase the weight percent of total nonvolatile material in the composition to above about 70% by weight of the total coating composition.

As used here and hereinafter, the term "coating composition" is defined as the composition including the low molecular weight epoxy resin; the phenolic resin; the solution grade vinyl chloride copolymer and/or high molecular weight epoxy resin; the vinyl chloride dispersion resin; and any other optional ingredients dispersed in the nonaqueous carrier. The term "cured coating composition" is defined as the adherent polymeric coating resulting from curing a coating composition.

Therefore, one important aspect of the present invention is to provide a coating composition that effectively inhibits the corrosion of ferrous and nonferrous metal substrates. The coating composition, after application to a metal substrate, and subsequent curing at a sufficient temperature for a sufficient time, provides an adherent layer of a cured coating composition that effectively inhibits corrosion, exhibits improved flexibility, mar resistance and adhesion to the metal substrate; and does not adversely affect a product, like a food or beverage, that contacts the cured coating composition. Because of these advantageous properties, the cured coating composition can be used to coat the interior of food and beverage containers and overcome the disadvantages associated with conventional polyvinyl chloride-based compositions and epoxy-based compositions. The cured coating composition comprises the low molecular weight epoxy resin, the phenolic resin, the solution grade vinyl chloride copolymer and/or high molecular weight epoxy resin, the vinyl chloride dispersion resin, and, if present, optional ingredients, essentially in the amounts these ingredients are present in the coating composition, expressed as nonvolatile material.

In accordance with another important aspect of the present invention, the cured coating composition demonstrates excellent flexibility and adhesion to a metal substrate. The excellent adhesion of the cured coating composition facilitates processing of the coated metal substrate into a coated metal article, like in molding or stamping process steps, such that the cured coating composition remains in continuous and intimate contact with the metal substrate. The cured coating composition exhibits excellent chemical resistance and does not adversely affect a food or beverage packaged in a container having an interior surface coated with the cured coating composition. The cured coating composition is sufficiently hard to resist scratching.

Yet another important aspect of the present invention is to provide a coating composition that contains a high molecular weight epoxy resin and a vinyl chloride dispersion resin. Prior attempts to combine a high molecular weight epoxy resin and a vinyl chloride dispersion resin failed because highly active solvents, like methyl ethyl ketone, which are necessary to solubilize a high molecular weight epoxy resin, also swelled and dissolved the vinyl chloride dispersion resin. Swelling and dissolution of the vinyl chloride dispersion resin leads to an unacceptable able increase in composition viscosity, or gelling of the composition. Surprisingly, the present compositions do not exhibit an unacceptable increase in viscosity, or gel, during storage at room temperature over the expected lifetime of the composition, i.e., about six months.

In accordance with another important aspect of the present invention, the coating composition can be stored in a single package without an unacceptable increase in viscosity, and provides a cured coating composition that overcomes the disadvantages of prior epoxy-based coatings and of prior polyvinyl chloride-based coatings used to coat the interior of containers for food and beverages. The present coating composition is an improvement over prior polyvinyl chloride-based and related halide-containing vinyl polymer-based coating compositions, and overcomes the disadvantage of the high cost of prior epoxy-based compositions. In addition, the present composition can be used on both the interior and exterior of can ends and can bodies, thereby obviating the need for a container manufacturer to use multiple coating compositions.

These and other aspects and advantages of the present invention will become apparent from the following detailed description of the preferred embodiments.

DETAILED DESCRIPTION OF THE PREFERRED EMBODIMENTS

A coating composition of the present invention, after curing, provides a cured coating composition that effectively inhibits the corrosion of metal substrates, such as, but not limited to, tin-free steel, blackplate, tinplate steel, aluminum, iron, steel and copper. The coating compositions, after curing, also demonstrate an excellent adhesion to the metal substrate; an excellent chemical resistance and scratch resistance; and an excellent flexibility. The cured coating composition does not impart a taste to foods or beverages that contact the cured coating composition.

In general, a present coating composition comprises: (a) a low molecular weight polyfunctional epoxy resin; (b) a phenolic resin; (c) a solution grade vinyl chloride copolymer, a high molecular weight epoxy resin, or a combination thereof; and (d) about 60% to about 90% by weight of nonvolatile material of a vinyl chloride dispersion resin, dispersed in a nonaqueous carrier. The coating composition can be packaged as a single unit system, and stored for extended periods of time without gelling or exhibiting an unacceptable increase in viscosity. In addition, the coating composition can include optional ingredients that improve the esthetics of the composition, that facilitate processing of the composition, or that improve a functional property of the composition. The individual composition ingredients are described in more detail below.

(a) Low Molecular Weight, Poly-functional Epoxy Novolac Resin

The coating composition of the present invention includes a low molecular weight polyfunctional epoxy novolac resin in an amount of about 2% to about 25% by weight of nonvolatile material. Preferably, the coating composition includes about 5% to about 15% of the low molecular weight epoxy novolac resin, by weight of nonvolatile material. To achieve the full advantage of the present invention, the coating composition includes about 8% to about 12% of the low molecular weight polyfunctional epoxy novolac resin, by weight of nonvolatile material.

A low molecular weight epoxy novolac resin useful in the present composition has a weight average molecular weight of about 200 to about 10,000, and preferably is an epoxy novolac resin having a weight average weight of about 200 to about 8,000. To achieve the full advantage of the present invention, the low molecular weight epoxy novolac resin has a weight average molecular weight in the range of about 500 to about 7,500.

Preferably, the low molecular weight epoxy novolac resin has an epoxy equivalent weight of about 100 to about 2000, and preferably about 150 to about 1,000. The low molecular weight epoxy novolac resin is a liquid and serves to stabilize the composition by inhibiting thermal and ultraviolet decomposition of composition ingredients. An exemplary, but nonlimiting, low molecular weight polyfunctional epoxy novolac resin is the liquid polyfunctional epoxy novolac resin liquid available commercially under the tradename EPN 1139 from CIBA-GEIGY Corporation, Hawthorne, N.Y.

A low molecular weight epoxy novolac resin has more than two epoxy groups per molecule (i.e., epoxy functionality), and typically has an epoxy functionality of about 2.1 to about 6. Preferably, the low molecular weight epoxy novolac resin has an epoxy functionality of about 2.2 to about 5.

(b) Phenolic Resin

In addition to the low molecular weight poly-functional epoxy resin, the coating composition also includes from about 2% to about 25%, and preferably from about 4% to about 15%, by weight of nonvolatile material, of a phenolic resin.

Generally, a phenolic resin utilized in the present composition is a condensation product resulting from a reaction between a phenol and formaldehyde, and has a low molecular weight in the range of about 150 to about 3,000, and preferably about 300 to about 1,000. Phenol, an alkylated phenol, a bisphenol, or essentially any other compound including a hydroxyphenyl moiety can be used as the phenol component of the phenolic resin. Nonlimiting examples of suitable phenol compounds includes phenol, cresylic acid and bisphenol A. Bisphenol A is a preferred phenol component of the phenolic resin. Such phenolic resins have been found to impart the greatest adhesion and resistance properties to the cured coating compositions of the present invention.

(c) Solution Grade Vinyl Chloride Copolymer, High Molecular Weight Epoxy Resin or Mixture Thereof The coating compositions of the present invention include a solution grade vinyl chloride copolymer, a high molecular weight epoxy resin, or a mixture thereof, in an amount of about 2% to about 25%, by weight of nonvolatile material.

Preferably, the composition includes about 5% to about 20% of a solution grade vinyl chloride copolymer, a high molecular weight epoxy resin or mixtures thereof, by weight of nonvolatile material. To achieve the full advantage of the present invention, the coating composition includes about 7% to about 12% of the solution grade vinyl chloride copolymer and/or high molecular weight epoxy resin by weight of nonvolatile material.

(1) Solution Grade Vinyl Chloride Copolymer

A useful solution grade vinyl chloride copolymer is exemplified, but not limited to, copolymers such as a vinyl chloride-vinyl acetate copolymer, a vinyl chloride-vinylidene chloride copolymer or a vinyl chloride-maleate copolymer. The solution grade vinyl chloride copolymers are available commercially under tradenames such as BAKELITE® VMCH; BAKELITE® VMCA; BAKELITE® VYHH, and BAKELITE® VMCC available from Union Carbide Corp., New York, N.Y. BAKELITE® VMCH is a white, powdered solid containing a solvent polymerized vinyl chloride-vinyl acetate copolymer with a chemical composition of about 85.0% to about 88.0% by weight of vinyl chloride, about 11.0% to about 14.0% by weight vinyl acetate, about 0.8% to about 1.2% by weight maleic acid, and having a specific viscosity from about 0.536 to 0.567 as measured by 1.0 gm (gram) resin per 100 ml (milliliters) of solution in methyl isobutyl ketone at 20° C. BAKELITE® VYHH contains about 87% by weight vinyl chloride and about 13% by weight vinyl acetate and has an intrinsic viscosity of about 0.50–0.55 measured in cyclohexanone at 20° C. BAKELITE® VMCC contains about 62% by weight vinyl chloride and about 38% vinyl acetate, and has an intrinsic viscosity (cyclohexanone at 20° C.) of about 0.28 and a specific gravity of about 1.30.

The solution grade vinyl chloride copolymer typically is vinyl chloride-vinyl acetate and/or vinyl chloride-lower alkyl maleate. The preferred solution grade vinyl chloride copolymer is a vinyl chloride-vinyl acetate copolymer, commercially available as BAKELITE® VMCH and BAKELITE® VYHH. Especially preferred is BAKELITE® VMCC vinyl chloride-vinyl acetate solution grade copolymer.

(2) High Molecular Weight Epoxy Resin

A high molecular weight epoxy resin useful in the present composition, either alone or in combination with the solution grade vinyl chloride copolymer, has a weight average molecular weight of about 30,000 to about 70,000, and preferably is an epoxy resin having a weight average molecular weight of about 30,000 to about 50,000. To achieve the full advantage of the present invention, the high molecular weight epoxy resin has a weight average molecular weight in the range of about 30,000 to about 40,000. Standard commercial epoxy resins of sufficient molecular weight can be used in the present coating compositions. In addition, epoxy resins that have been chain extended to the desired molecular weight by methods well known in the art also can be used in the present coating compositions. These high molecular weight epoxy resins differ from epoxy novolac resins in that the high molecular weight epoxy resins contain about 1.1 up to about 2 epoxy groups per molecule, and preferably about 1.5 to about 2 epoxy groups per molecule (i.e., an epoxy functionality of about 1.1 to about 2, and preferably about 1.5 to about 2).

Therefore, epoxy resins useful in the present invention include for example, but are not limited to, bis-(2,3-epoxycyclohexyl)ether; and glycidyl and diglycidyl ethers of aliphatic, cycloaliphatic or aromatic polyols; and glycidyl esters of polybasic carboxylic acids. The preferred epoxy resins are based on a bisphenol, and especially bisphenol A, that have been chain-extended to a weight average molecular weight of about 30,000 to about 70,000.

One nonlimiting example of an epoxy resin useful in the present invention is D.E.R.® 684EK40 available from Dow Chemical Co., Midland, Mich. This epoxy resin has a weight average molecular weight of about 38,000 and an epoxy equivalent weight of about 9000. Other nonlimiting examples of a high molecular weight epoxy resin useful in the present invention is ARALDITE® GZ 488 PMA-32 available from CIBA-GEIGY Corp., Hawthorne, N.Y.; and EPONOL 55-L-32, available from Shell Chemical Co., Houston, Tex.

(d) Vinyl Chloride Dispersion Resin

The coating compositions of the present invention also include about 60% to about 90%, and preferably about 65% to about 80%, by weight of nonvolatile material, of a vinyl chloride dispersion resin. To achieve the full advantage of the present invention, the coating composition includes about 65% to about 75% by weight of nonvolatile material, of a vinyl chloride dispersion resin.

Prior polyvinyl chloride-based coating compositions included a vinyl chloride dispersion resins in amounts of about 50% or less by weight of nonvolatile material, and amounts of solution grade vinyl chloride copolymer in excess of 20%, by weight of nonvolatile material, to achieve satisfactory properties in the cured coating. In addition, the prior polyvinyl chloride-based compositions were packaged as a two-unit system because of an unacceptable viscosity increase that occurred within 24 to 48 hours after all composition ingredients were admixed.

Surprisingly, the present coating compositions include an increased amount of the more economical vinyl chloride dispersion resin (i.e., about 60% to about 90% by weight of nonvolatile material) and, typically, a decreased amount of solution grade vinyl chloride copolymer, yet perform at least as well as prior polyvinyl chloride-based coating compositions, is more economical, and can be packaged as a single unit system for an extended time (i.e., from manufacture until use) without an unacceptable increase in viscosity.

The vinyl chloride dispersion resin is a solid polyvinyl chloride compound that is dispersed in the nonaqueous carrier of the coating composition. The vinyl chloride dispersion resin is a finely divided polymer of vinyl chloride having an average weight molecular weight above about 20,000.

The vinyl chloride dispersion resin is a homopolymer, but can include a minor amount of another monomer as a part thereof. However, the vinyl chloride dispersion resin includes at least 90% by weight, preferably at least 95% or more by weight of polyvinyl chloride. Commercially available vinyl chloride homopolymer dispersion resins, such as GEON® 171, a solid stir-in type high molecular weight polyvinyl chloride resin in the form of a fine white powder, having a specific gravity of about 1.4, a bulk density of about 20–25 lbs/ft³ (pounds per cubic foot), and an inherent viscosity of about 1.4, can be used in the present coating compositions.

Nonaqueous Carrier

The present coating compositions are nonaqueous compositions, wherein the low molecular epoxy resin, the phenolic resin, the high molecular weight epoxy resin and/or solution grade vinyl chloride copolymer, and vinyl chloride dispersion resin are homogeneously dispersed in a suitable nonaqueous carrier. It should be understood that a present coating composition can include a relatively low amount of water, such as up to about 0.5% by total weight of the composition, without adversely affecting the coating composition, either prior to or after curing. The water can be added to the composition intentionally, or can be present in the composition inadvertently, such as when water is present in a particular component included in the coating compositions.

The combination of a high molecular weight epoxy resin and a vinyl chloride dispersion resin in a composition that does not gel or generate an unacceptable increase in viscosity after six months storage at room temperature is unexpected. High molecular weight epoxy resins are difficult to solubilize. Therefore, highly active solvents, such as methyl ethyl ketone, typically are used to solubilize the high molecular weight epoxy resin. However, highly active solvents swell or dissolve the vinyl chloride dispersion resin, which results in either gelling or increasing the viscosity of a mixture of a vinyl chloride dispersion resin and an active solvent. Such gelled or high viscosity compositions are commercially unacceptable. Until the present invention, it has been difficult to impossible to provide a composition containing a high molecular weight epoxy resin and a vinyl chloride dispersion resin, in a stable single unit composition, because of differences in resin solubility characteristics. The nonaqueous carrier, therefore, is an important component of the coating composition.

In general, a suitable nonaqueous carrier has sufficient volatility to evaporate essentially entirely from the coating composition during the curing process, such as during heating at about 340° F. to about 500° F. for about 1 to about 12 minutes. Suitable nonaqueous carriers are known in the art of coating compositions and are organic solvents, or mixtures of organic solvents, that solubilize the high molecular weight epoxy resin and do not gel or appreciably swell the vinyl chloride dispersion resin. A suitable nonaqueous carrier, therefore, is an organic solvent, or solvent blend, that provides a coating composition that does not gel after storage at 25° C. for six months.

Nonaqueous carriers include, for example, but are not limited to, glycol ethers, like ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, tripropylene glycol monomethyl ether, and propylene glycol monomethyl ether, ketones, like diisobutyl ketone, diacetone alcohol, isophorone, ethyl amyl ketones, methyl amyl ketones and methyl isoamyl ketone; aromatic hydrocarbons, like naphthas, toluene, benzene and xylene, aliphatic hydrocarbons, like mineral spirits, kerosene and high flash VM&P naphtha; alcohols, like isopropyl alcohol, n-butyl alcohol and ethyl alcohol; and aprotic solvents, like tetrahydrofuran; chlorinated solvents; esters, like hexyl acetate and n-butyl acetate; glycol ether esters, like propylene glycol monomethyl ether acetate, and mixtures thereof. Highly active organic solvents, like methyl ethyl ketone, cyclohexanone or methyl isobutyl ketone, which are not suitable nonaqueous carriers when used alone, can be used as a component of the nonaqueous carrier as long as the coating composition does not gel during storage over six months at 25° C. Persons skilled in the art of formulating coating compositions are capable of designing such nonaqueous carrier mixtures.

The nonaqueous carrier serves both as a diluent and as a dispersant for the other ingredients of the coating composition. The nonaqueous carrier usually is included in the composition in a sufficient amount to provide a composition including from about 20% to about 70% by weight of the composition, of the total weight of (a), (b), (c) and (d). The amount of nonaqueous carrier included in the composition is limited only by the desired, or necessary, rheological properties of the composition. Usually, a sufficient amount of nonaqueous carrier is included in the coating composition to provide a composition that can be processed easily, that can be applied to a metal substrate easily and uniformly, and that is sufficiently removed from the coating composition during curing within the desired cure time.

Therefore, essentially any nonaqueous carrier is useful in the present coating composition as long as the nonaqueous carrier adequately disperses and/or solubilizes the composition components; does not gel or increase the viscosity of the composition such that excessive reduction with organic solvents is necessary to lower the viscosity for proper application properties; is inert with respect to interacting with composition components and thereby adversely affecting the stability of the coating composition or the ability of the coating composition to effectively cure; and evaporates quickly, essentially entirely and relatively rapidly to provide a cured coating composition that inhibits the corrosion of a metal substrate, that does not adversely affect a food or beverage that contacts the cured coating composition, and that demonstrates sufficient physical properties, like adhesion and flexibility, for use as a coating on the interior or exterior of a container.

(e) Optional Ingredients

A coating composition of the present invention also can include optional ingredients that do not adversely affect the coating composition or a cured coating composition resulting therefrom. Such optional ingredients are known in the art, and are included in the composition to enhance composition esthetics, to facilitate manufacturing, processing, handling and application to the composition, and to further improve a particular functional property of the coating composition or a cured coating composition resulting therefrom.

Such optional ingredients include, for example, lubricants, dyes, pigments, extenders, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount that adversely affects the basic coating composition or a cured coating composition resulting therefrom. For example, up to about 10% by weight of nonvolatile material of a lubricant, like a polytetrafluoroethylene, a paraffin wax, a silicone, a polyglycol or lanolin, is included in the coating composition to assist in lubricating and handling a metal substrate coated with the cured coating composition.

Another important optional ingredient is a pigment, such as titanium dioxide or an aluminum pigment. Such pigments are included in coating compositions for cans used to package food products such as tuna fish. These pigments are well known to persons skilled in the art. Typically, the pigment is present at 0% to about 50% by total weight of the composition. An exemplary, but non limiting, aluminum pigment is SUPER FINE 'N ALUMINUM PASTE,' available commercially from Silberline Manufacturing Co.

A coating composition of the present invention is prepared by simply admixing or dispersing the low molecular weight epoxy resin, the phenolic resin, the solution grade vinyl chloride copolymer and/or high molecular weight epoxy resin, the vinyl chloride dispersion resin, and any optional ingredients, in any desired order, in the nonaqueous carrier, with sufficient agitation. The resulting mixture is admixed until all the composition ingredients are homogeneously dispersed throughout the nonaqueous carrier. Then, an additional amount of the nonaqueous carrier can be added to the coating composition to adjust the amount of nonvolatile material in the composition to a predetermined level.

To demonstrate the usefulness of the coating compositions of the present invention, the following Examples were prepared, applied to a metal substrate, and then cured to provide a coated metal substrate. The coated metal substrates then were tested, comparatively, for use as the interior or exterior coating of a food or beverage container or closure. The cured coating compositions were tested for an ability to inhibit corrosion of a metal substrate; for adhesion to the metal substrate; for chemical resistance; for flexibility; and for scratch and mar resistance. The following Example 1 illustrates one important embodiment a composition of the present invention and its method of manufacture.

EXAMPLE 1

| Ingredient | % (by weight of total composition) | % (by weight of nonvolatile material) |
| --- | --- | --- |
| Low Molecular Weight Epoxy Resin[1] | 5.85% | 10.81% |
| Phenolic Resin[2] | 7.80% | 7.21% |
| Solution Grade Vinyl Chloride Copolymer[3] | 24.49% | 9.04% |
| Vinyl Chloride Dispersion Resin[4] | 39.01% | 72.05% |
| Lubricant[5] | 1.63% | 0.90% |
| Diisobutyl Ketone[6] | 10.61% | |
| Diacetone Alcohol[6] | 10.61% | |

[1] ARALDITE ® EPN 1139, available from CIBA-GEIGY Corporation, including 100% by weight of a low molecular weight polyfunctional epoxy novolac resin;
[2] a phenolic resin, based upon bisphenol A, and formaldehyde, including about 50% by weight nonvolatile material in a solvent blend including toluene, deionized water and ethylene glycol monobutyl ether to provide about 3.90% by weight of the total composition of Example 1, of the phenolic resin;
[3] BAKELITE ® VINYL SOLUTION RESIN VMCC, available from Union Carbide Corp., New York, NY., added as a 20% by weight solution in nonaqueous solvents, to provide about 4.90% by total weight of the composition of example of a solution grade vinyl chloride polymer;
[4] GEON ® 171, available from the BF Goodrich Co., Cleveland Ohio, including 100% by weight of a polyvinyl chloride homopolymer;
[5] Lanolin, as a 30% active ingredient, to provide about 0.5% by total weight of the composition of Example 1 of a lubricant; and
[6] Nonaqueous carrier, the composition also includes small amounts of xylene, diisobutyl ketone, isophorone and diacetone alcohol from the solution grade vinyl chloride copolymer solution.

The composition of Example 1 was prepared by first admixing the diisobutyl ketone and diacetone alcohol in a vessel to form a nonaqueous carrier mixture. Then, the low molecular weight epoxy resin was added to the nonaqueous carrier mixture with agitation. Next, the phenolic resin was added to the resulting mixture, with agitation, until all the composition components were homogeneously dispersed throughout the mixture. Next, the vinyl chloride dispersion resin was sifted into the mixture with good agitation. The resulting mixture was stirred until homogeneous, then subjected to a sand grind to 6.5 Hegman. Next, the lubricant was dispersed throughout the mixture. Finally, the solution grade vinyl chloride copolymer, which previously was dispersed in nonaqueous solvents was added to the homogeneous mixture. After sufficient admixing, a composition (Example 1) of the present invention, including about 54% by weight total nonvolatile material was provided.

The composition of Example 1 had a viscosity of about 80 seconds at 77° F. (i.e., 25° C.) on #4 Ford Cup, when manufactured. The composition of Example 1 was stable after 6 months storage at 77° F. The composition of Example 1 increased in viscosity during storage, but not to such a degree that application of the composition of Example 1 to a metal substrate was adversely affected. If necessary, a 50/50 blend (by weight) of xylene and isophorone can be added to the composition of Example 1 to reduce the viscosity of the composition to 80±20 seconds at 77° F. (#4 Ford Cup), and therein facilitate application of the composition of Example 1 to a metal substrate. The composition of Example 1 was roll coated on to a metal substrate, in an amount of 40 mg (milligrams) per 4 sq. in. (square inches) for interior applications, and in an amount of 16 mg per 4 sq. in. for exterior applications. The coated substrate then was cured at about 400° F. for about 8 to 10 minutes to provide a light gold-colored, cured coating compositions having excellent adhesion, flexibility, chemical resistance and mar resistance properties on the interior. Similarly, on the exterior, the coated substrate was cured at about 400° F. for about 8 to 10 minutes to provide a clear, cured coating having the same excellent properties as the interior coating.

The composition of Example 2 was prepared in an identical manner to the composition of Example 1. In Example 2, a high molecular weight epoxy resin was used in place of the solution grade vinyl chloride copolymer. The composition of Example 2 exhibited properties similar to the composition of Example 1 with respect to storage stability and with respect to the properties exhibited by the cured coating composition.

EXAMPLE 2

| Ingredient | % (by weight of total composition) | % (by weight of nonvolatile material) |
| --- | --- | --- |
| Low Molecular Weight Epoxy Resin[1] | 4.86% | 10.80% |
| Phenolic Resin[2] | 6.48% | 7.20% |
| High Molecular Weight Epoxy Resin[7] | 16.28% | 9.04% |
| Vinyl Chloride Dispersion Resin[4] | 32.43% | 72.05% |
| Lubricant[5] | 1.35% | 0.91% |
| Diisobutyl Ketone[6] | 19.30% | |
| Diacetone Alcohol[6] | 19.30% | |

[7] a high molecular weight resin, based upon bisphenol A and epichlorohydrin having a theoretical molecular weight of about 30,000 and including 25% by weight nonvolatile material in a nonaqueous solvent blend of butyl cellosolve, cyclohexanone and xylene, to provide about 4.07% by weight the total composition of Example 2 of a high molecular weight epoxy resin.

The following composition of Comparative Example 1 is a standard, commercially available coating composition prepared in accordance with Kaufman, Jr. et al. U.S. Pat. No. 3,114,725. The composition of Comparative Example 1 includes a greater total amount of solution grade vinyl chloride copolymer (33.49% by weight of nonvolatile material in total) and a lesser amount of vinyl chloride dispersion resin (54.05% by weight of nonvolatile mixture). Investigators conventionally thought that increasing the amount of vinyl chloride dispersion resin at the expense of the solution grade vinyl chloride copolymer would provide a coating composition having too high of viscosity for practical application to a metal substrate. Surprisingly, a coating composition of the present invention, e.g., a composition of Example 1 or Example 2, had an acceptable viscosity for application to a metal substrate, and could be packaged as a single-unit system, for extended time periods, without generating an unacceptable increase in viscosity.

COMPARATIVE EXAMPLE 1

| Ingredient | % (by weight of nonvolatile material) |
|---|---|
| Low Molecular Weight Epoxy Resin[8] | 6.76% |
| Phenolic Resin | 4.60% |
| Solution Grade Vinyl Chloride Copolymer-1[9] | 6.15% |
| Solution Grade Vinyl Chloride Copolymer-2[10] | 19.66% |
| Solution Grade Vinyl Chloride Copolymer-3[3] | 7.68% |
| Lubricant | 1.10% |
| Vinyl Chloride Dispersion Resin[4] | 54.05% |

[8] ARALDITE ® 6010, available from CIBA-GEIGY Corporation, including 100% by weight of a low molecular weight polyfunctional epoxy resin;
[9] BAKELITE ® VINYL SOLUTION RESIN VYHH, available from Union Carbide Corp, New York, NY.; and
[10] BAKELITE ® VINYL SOLUTION RESIN VMCH, available from Union Carbide Corp, New York, NY.

The compositions of Examples 1 and 2 also were compared to the following composition of Comparative Example 2, a commercially available interior can coating composition.

COMPARATIVE EXAMPLE 2

| Ingredient | % (by weight of nonvolatile material) |
|---|---|
| Low Molecular Weight Epoxy Resin | 17.94% |
| Benzoguanamine | 9.17% |
| Solution Grade Vinyl Chloride Copolymer[10] | 21.59% |
| Lubricant | 1.40% |
| Vinyl Chloride Dispersion Resin[4] | 36.19% |
| Plasticizer[11] | 13.02% |
| Phosphoric Acid | 0.70% |

[11] PARAPLEX ® G-25, a polyester sebacate, available as a 100% active material from the C. P. Hall Co., Chicago, Illinois.

The compositions of Examples 1 and 2 after application to a metal substrate and subsequent curing, performed at least as well as the composition of Comparative Examples 1 and 2 in comparative tests. Such a result is unexpected because the compositions of Examples 1 and 2 include an amount of vinyl chloride dispersion resin conventionally considered as too large to provide an acceptable composition. In addition, the compositions of Examples 1 and 2, after curing, have consistently exhibited coating properties equal or superior to current commercial compositions for similar end uses.

In particular, the compositions of Examples 1 and 2, and Comparative Examples 1 and 2, were applied to aluminum, tin-free steel and tinplate substrates (i.e., a panel), in a sufficient amount to provide a interior cured film weight of about 40 mg/in$^2$ (milligrams per square inch of metal substrate) and an exterior cured film of about 16 mg/in$^2$. The exterior coating is applied first and is cured for about 10 minutes at 400° F. The interior coating then is applied, and cured at 400° F. for about 10 minutes. In general, after applying the composition of Examples 1 or 2, or the composition of Comparative Examples 1 or 2, to a metal substrate, the composition is cured at about 390° F. to about 400° F. for about 8 minutes to about 10 minutes. The cured coatings of the Examples and Comparative Examples then were subjected to an enamel rating test. Optionally, the coating composition can be coil cured for about 6 seconds to about 60 seconds at about 425° F. to about 650° F. peak metal temperature.

The enamel rating test tests the continuity of a coating film applied to a can part, such as a can end or a can body. A can end or can body is formed after the metal substrate is coated. Therefore, the cured coating has been deformed during this manufacturing step.

The enamel rating test measures the passage of current from an electrode through an electrolyte to the formed can part. The coating functions as an insulator, and accordingly no current flows if film continuity is perfect. The lower the milliamp (mA) reading, the more continuous the coating on the metal substrate. The data in Table 1 shows a relatively low milliamp reading for can parts coated with the composition of Examples 1 and 2, therefore showing good film continuity.

TABLE 1

ENAMEL RATING OF COATING COMPOSITIONS

| Example | Substrate Coating | Amount | Curing Conditions | Enamel Rating (Range) (mA) | Enamel Rating (Average) (mA) |
|---|---|---|---|---|---|
| 3 | Exterior: Example 1 | 16 mg./4 sq. in. | 10' @ 400° F. | 0.0–4.9 | 1.5 |
|   | Interior: Example 1 | 40 mg./4 sq. in. | 10' @ 400° F. | | |
| 4 | Exterior: Example 2 | 16 mg./4 sq. in. | 10' @ 400° F. | 0.0–5.6 | 2.2 |
|   | Interior: Example 2 | 40 mg./4 sq. in. | 10' @ 400° F. | | |
| 5 | Exterior: Standard Epoxy/Urea Composition (Control) | 16 mg./4 sq. in. | 10' @ 400° F. | 0.4–6.1 | 2.8 |
|   | Interior: Comparative Example 2 | 32 mg./4 sq. in. | 10' @ 390° F. | | |
| 6 | Exterior: Example 1 | 16 mg./4 sq. in. | 10' @ 400° F. | 0.0–3.8 | 1.0 |
|   | Interior: Example 1 | 40 mg./4 sq. in. | 10' @ 400° F. | | |
| 7 | Exterior: Example 2 | 16 mg./4 sq. in. | 10' @ 400° F. | 0.0–3.3 | 1.1 |
|   | Interior: Example 2 | 40 mg./4 sq. in. | 10' @ 400° F. | | |
| 8 | Exterior: Standard Epoxy/Urea Compositon (Control) | 16 mg./4 sq. in. | 10' @ 400° F. | 0.0–5.0 | 2.2 |
|   | Interior: Comparative Example 2 | 32 mg./4 sq. in. | 10' @ 390° F. | | |

The data summarized in Table 1 illustrate that compositions of the present invention perform as well as, or better than, commercial coating compositions presently used in the industry with respect to enamel rating. As illustrated in Table 1. Examples 3 and 4 outperformed control Example 5 on tinplate substrates, and Examples 6 and 7 outperformed control Example 8 on the tin-free steel substrates. The cured compositions of Examples 1 and 2 also exhibited good blush and stain resistance. The compositions of Examples 1 and 2 performed comparably to present day commercial coating compositions in both deep and shallow drawn can fabrication.

The coating compositions of the present invention also demonstrated an excellent adhesion to the metal substrate and provided a transparent cured coating of acceptable color (clear to light gold) and sufficient hardness.

Comparative tests illustrated that a cured coating composition of Example 1 or 2 is flexible and maintains adhesion to the metal substrate, is sufficiently hard and therefore is scratch and mar resistant, and resists blush. Therefore, a composition of the present invention is useful in various coating processes. The above combination of advantages are necessary, or at least desirable, in a coating applied to the interior or exterior of food and beverage containers, to closures or to can ends. In addition, compositions of the present invention afford unexpected economies to can manufacturers, and to food and beverage manufacturers.

Obviously, many modifications and variations of the invention as hereinbefore set forth can be made without departing from the spirit and scope thereof and therefore only such limitations should be imposed as are indicated by the appended claims.

What is claimed is:

1. A coating composition for a metal substrate comprising:
   (a) about 2% to about 25% by weight of nonvolatile material of a low molecular weight polyfunctional epoxy novolac resin having an epoxy functionality of about 2.1 to about 6, said low molecular weight epoxy resin having a weight average molecular weight of about 200 to about 10,000;
   (b) about 2% to about 25% by weight of nonvolatile material of a phenolic resin;
   (c) about 2% to about 25% by weight of nonvolatile material of a high molecular weight epoxy resin having an epoxy functionality of about 1.1 to about 2, said high molecular weight epoxy having a weight average molecular weight of about 10,000 to about 70,000;
   (d) about 60% to about 90% by weight of nonvolatile material of a vinyl chloride dispersion resin; and
   (e) a sufficient amount of a nonaqueous carrier such that the coating composition includes about 20% to about 70% by weight of the composition of the total weight of (a), (b), (c), and (d).

2. The composition of claim 1 wherein the low molecular weight epoxy novolac resin has a weight average molecular weight of about 200 to about 8,000.

3. The composition of claim 1 wherein the low molecular weight epoxy novolac resin has an epoxy equivalent weight of about 100 to about 2,000.

4. The composition of claim 1 wherein the phenolic resign comprises bisphenol A.

5. The composition of claim 1 wherein the high molecular weight epoxy resin has a weight average molecular weight of about 10,000 to about 50,000.

6. The composition of claim 1 wherein the vinyl chloride dispersion resin is present in an amount of about 65% to about 75% by weight of nonvolatile material.

7. The composition of claim 1 wherein the vinyl chloride dispersion resin includes at least 90% by weight polyvinyl chloride.

8. The composition of claim 1 further comprising 0% to about 10% by weight of nonvolatile material of a lubricant.

9. The composition of claim 8 wherein the lubricant is selected from the group consisting of a polytetrafluoroethylene, a paraffin wax, a silicone, a polyglycol, and lanolin.

10. The composition of claim 1 wherein the nonaqueous carrier comprises diisobutyl ketone, diacetone alcohol, n-butyl alcohol, ethylene glycol monobutyl ether, and mixtures thereof.

11. The composition of claim 1 further comprising 0% to about 50% by weight of nonvolatile material of a pigment.

12. The composition of claim 1 comprising:
   (a) about 5% to about 15% by weight by weight of nonvolatile material of a low molecular weight polyfunctional epoxy novolac resin, said low molecular weight epoxy resin having a weight average molecular weight of about 500 to about 7,500 and an epoxy equivalent weight of about 150 to about 1,000;
   (b) about 4% to about 15% by weight of nonvolatile material of a phenolic resin having a molecular weight of about 150 to about 3,000;
   (c) about 5% to about 20% by weight of nonvolatile material of a high molecular weight epoxy resin, said high molecular weight having a weight average molecular weight of about 10,000 to about 40,000; and
   (d) about 65% to about 80% by weight of nonvolatile material of a vinyl chloride dispersion resin.

13. A method of coating a metal substrate comprising:
   (a) applying a coating composition of claim 1 to at least one surface of the metal substrate; and
   (b) heating the metal substrate having the coating composition applied thereon for a sufficient time and at a sufficient temperature to remove the nonaqueous carrier from the composition and provide a cured coating.

14. The method of claim 13 wherein the metal substrate having the coating composition applied thereon is heated for about one to about twelve minutes at a temperature of about 340° F. to about 500° F.

15. The method of claim 13 wherein the metal substrate having the coating composition applied thereon is heated for about 6 seconds to about 60 seconds at about 425° F. to about 650° F. peak metal temperature to provide a cured coating.

16. A metal article having at least one surface thereof coated with an adherent layer of a cured coating composition of claim 1.

17. The metal article of claim 16 wherein the article is a food container, a beverage container, or a closure for a food or beverage container.

* * * * *

UNITED STATES PATENT AND TRADEMARK OFFICE
CERTIFICATE OF CORRECTION

PATENT NO.  : 5,776,569
DATED       : July 7, 1998
INVENTOR(S) : Harold F. Cole

It is certified that error appears in the above-identified patent and that said Letters Patent is hereby corrected as shown below:

Column 15, line 58, "resign" should be --resin--

Signed and Sealed this

Second Day of March, 1999

Attest:

Q. TODD DICKINSON

*Attesting Officer*  *Acting Commissioner of Patents and Trademarks*